W. P. DODSON.
Sad-Irons.
No. 140,483.    Patented July 1, 1873.
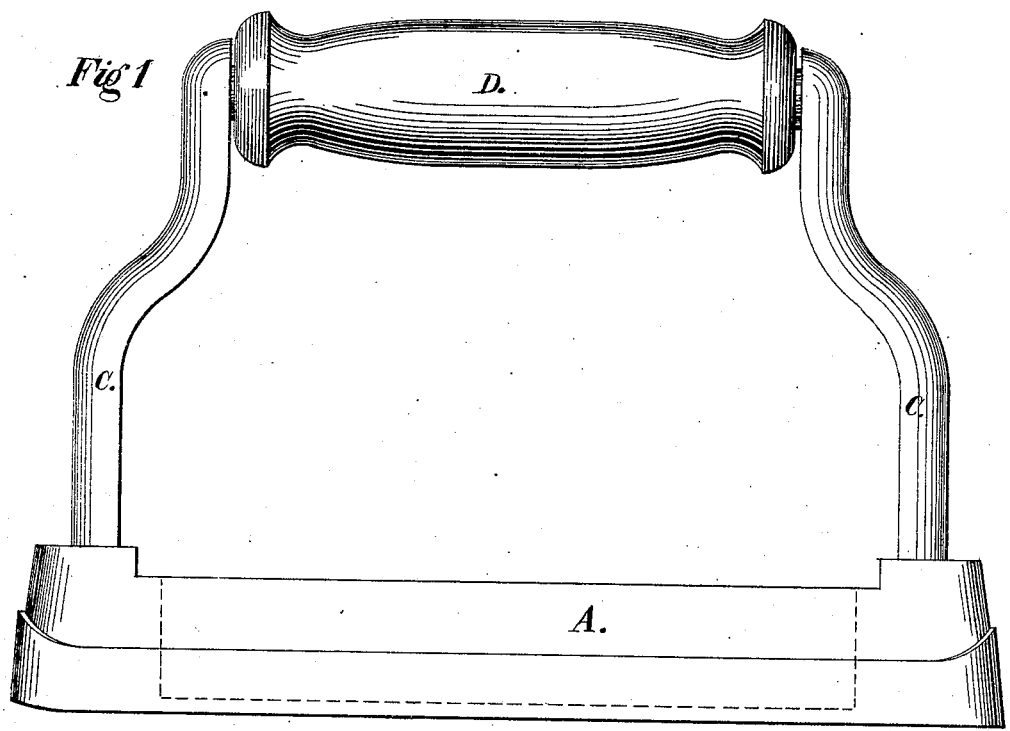
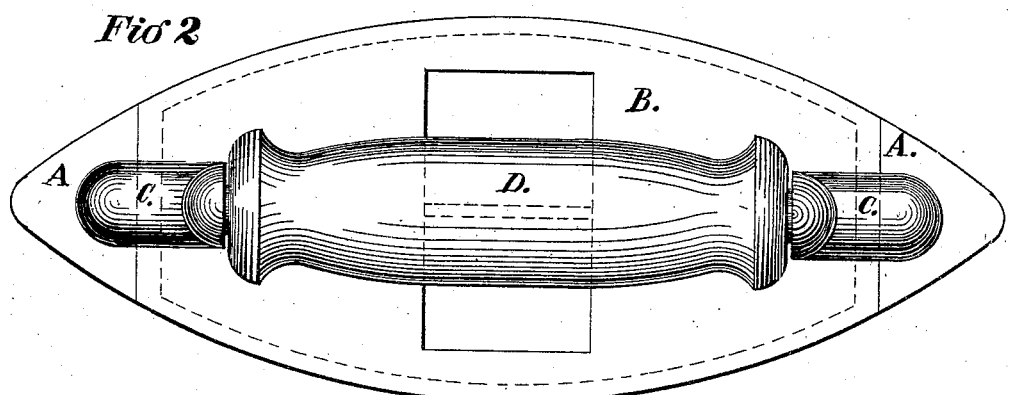
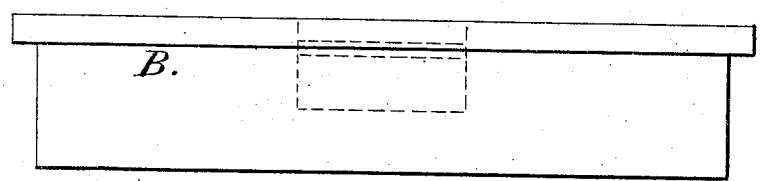
Witnesses.    Inventor.

UNITED STATES PATENT OFFICE.

WILSON P. DODSON, OF PHILADELPHIA, PENNSYLVANIA.

IMPROVEMENT IN SAD-IRONS.

Specification forming part of Letters Patent No. 140,483, dated July 1, 1873; application filed June 2, 1873.

*To all whom it may concern:*

Be it known that I, WILSON P. DODSON, of the city of Philadelphia, State of Pennsylvania, have invented an Improvement in Sad-Irons, of which the following is a specification:

My invention relates to the construction of a sad-iron, consisting of a shell or hollow case which need not be put upon the fire, and a heater easily removed and replaced, and having a wooden handle which is attached to the body of the iron by wrought-iron posts.

I am aware that sad-irons have been constructed with a hollow shell and a heater, but such shells have been cased in, and the heater, which is liable to warp by the action of the fire, will not, when so warped, fit into the place assigned to it, and consequently the shell cannot be closed; but I construct the shell A entirely open at the top and drop into it the heater B, which is furnished with a rod by which it can be handled with an ordinary stove-lifter, and although it may become warped it will still take its place without inconvenience.

I am aware that such shell-irons have been made with handles rigidly attached to the shell, but in that case they were closed on top and open behind, and the heater had to be so inserted, which was a very inconvenient method, and required the iron to be made with one end broad and square.

Where the handles have been attached to the detachable top of the shell the connection with the bottom is slack, and is liable to be loosened. The handles of such irons have been constructed of iron, sometimes wrought and sometimes cast, and sometimes of the two combined; but they heat and burn the hand, and they have been constructed entirely of wood, which is free from that objection, but is liable to break and to be injured by the heat of the body of the iron; but I construct the handle of my iron of two upright posts, c c, of wrought-iron, which are cast into the shell, carrying between them at the top a wooden hand-piece, D, which is sufficiently removed from the body of the iron to prevent its being burned, and which can be held in the hand without a holder, giving the comfort of the wooden handle with the durability of that of wrought-iron, and, as to the body of the iron, the greatest cheapness and convenience with the least liability to get out of order.

I claim as my invention—

The shell A open at the top to receive a heater, B, and provided with a handle rigidly attached thereto, for use as a sad-iron, substantially as described.

WILSON P. DODSON.

Witnesses:
G. MORGAN ELDRIDGE,
F. H. ELDRIDGE.